(12) United States Patent
Peleus et al.

(10) Patent No.: US 6,874,002 B1
(45) Date of Patent: Mar. 29, 2005

(54) SYSTEM AND METHOD FOR NORMALIZING A RESUME

(75) Inventors: Joakim F. Peleus, Santa Cruz, CA (US); Claro Villanueva, Santa Cruz, CA (US)

(73) Assignee: MagnaWare, Inc., Santa Cruz, CA (US)

( * ) Notice: Subject to any disclaimer, the term of this patent is extended or adjusted under 35 U.S.C. 154(b) by 238 days.

(21) Appl. No.: 09/898,171

(22) Filed: Jul. 3, 2001

Related U.S. Application Data

(60) Provisional application No. 60/215,709, filed on Jul. 3, 2000.

(51) Int. Cl.[7] ............................................ G06F 17/30
(52) U.S. Cl. .............................. 707/204; 707/3; 707/10; 707/104.1
(58) Field of Search .............................. 707/1–3, 6, 10, 707/204; 715/536, 513, 505, 523; 207/1–3, 10, 206

(56) References Cited

U.S. PATENT DOCUMENTS

| | | | | |
|---|---|---|---|---|
| 5,758,324 A | * | 5/1998 | Hartman et al. | 705/1 |
| 5,835,712 A | * | 11/1998 | DuFresne | 707/10 |
| 5,987,480 A | * | 11/1999 | Donohue et al. | 715/501.1 |
| 5,999,939 A | * | 12/1999 | De Hilster et al. | 707/102 |
| 6,088,700 A | * | 7/2000 | Larsen et al. | 707/10 |
| 6,438,515 B1 | * | 8/2002 | Crawford et al. | 704/5 |
| 6,605,120 B1 | * | 8/2003 | Fields et al. | 715/513 |
| 6,623,529 B1 | * | 9/2003 | Lakritz | 715/536 |

OTHER PUBLICATIONS

Person, Ron "Using Word version 6 for Windows"; Que Corporation, 1993, ISBN: 1–56529–469–6. Library of congress catalog No: 93–86247, David P. Ewing, 1993, p. 166–191.*

* cited by examiner

Primary Examiner—Shahid Alam
Assistant Examiner—Cam Y Truong
(74) Attorney, Agent, or Firm—Foley & Lardner LLP

(57) ABSTRACT

A computer based system and method for creating a standardized or normalized resume format, extracting resume information from the normalized resume, and automatically inputting the resume information into a resume database.

12 Claims, 5 Drawing Sheets

Normalized Resume

Application Date: *10/11/1999*
Availability Date *01/01/2000*

*Susan B. Anthony*
*35 Tweed Terrace*
*Santa Cruz, CA 92301, USA*
*1 (831) 555-8542*
*sbanthony@hotmail.com*

Objective: *To obtain an entry-level managerial position utilizing my skills developed through my UCLA education in the business and human resources fields*

Education: University of California at Los Angeles, UCLA

Degree: Bachelor of Arts, Sociology
 Specialization: Labor and Workplace Studies Awards: Education Abroad Program Scholar 1997-98, Lund University, Sweden
UCLA Sociology Honor Society Experience: *Promotions and Marketing Assistant, House of Blues, 10/96-08/97*
*Planned and implemented marketing strategies; designed promotional programs with media and talent management agencies; and supervised accounts and financial management of the concerts*

Resume Database Record

Application Date: 10/11/1999

Name: Susan B. Anthony

Address: 35 Tweed Terrace.
Santa Cruz, CA 92301 USA

Email: sbanthony@hotmail.com

Objective: To obtain an entry-level managerial position utilizing my skills developed through my UCLA education in the business and human resources fields Experience: Promotions and Marketing Assistant, House of Blues, 10/96-08/97
Planned and implemented marketing strategies; designed promotional programs with media and talent management agencies; and supervised accounts and financial management of the concerts

Fig. 5

SYSTEM AND METHOD FOR NORMALIZING A RESUME

This application claims the benefit of Provisional Application No. 60/215,709, filed Jul. 03, 2000.

FIELD OF INVENTION

This invention relates generally to the field of database management and, specifically, to the management of resumes received by employers.

BACKGROUND OF INVENTION

Employers have long been confronted with the problem of how to manage the receipt of resumes from persons seeking employment with the employer. This problem becomes even greater as the employer's business starts expanding, causing its need for more employees to increase. Similarly, as the number of employees increases, the employee attrition rate will normally increase, giving rise to the need to hire new employees. Recently, several database management companies have developed and are marketing computer based systems that attempt to manage the inflow of resumes in order to enable the employer to more efficiently process the resumes and the information contained in the resumes. These resume database managers typically create extensive databases for an employer that are used to organize the resume information or content into various categories, which may be related to employment positions which need to be filled, or may be archived so that the applicant's resume information can be retrieved at some later time when the need arises.

Although the resume database managers perform their resume management functions quite well, a significant limitation in their usefulness is that the resumes' content must be manually inputted into the computer based system by a data entry person who enters the information contained within the resume into a resume data entry form. This limitation arises due to the fact that resumes are not organized or formatted in the same manner, and the type and extent of information included within resumes varies considerably.

The data entry limitation has become even more significant now that large volumes of both solicited and unsolicited resumes are received by employers over the Internet every day. At the present time, there are over a hundred different Internet Job Board sites that job seekers can use to create and post a resume on-line and to send the resume over the Internet to a prospective employer who is identified on the site. Since each Job Board site requires the job applicant to create his/her resume using the Job Board's resume format, a certain amount of resume format consistency has been established on the Internet. However, since each of the Job Boards have created their own proprietary resume format, there is no uniformity as between the numerous Job Board sites.

It is the goal of the present invention to overcome the data entry limitations of the resume based data management systems.

SUMMARY OF INVENTION

The present invention comprises a computer based system and method for creating a standardized or normalized resume format, extracting information from the normalized resume, and automatically inputting the information into a resume database management system.

Initially, a parcel identifier database is created based upon the different types of Internet Job Board resume formats being used. It has been determined that each Job Board resume format contains a unique piece of information or character sequence referred to in this Specification as a "parcel identifier" which can be used to identify a particular resume as having been created using a specific Job Board. Accordingly, the parcel identifier database is created by storing in the memory of the computer system a list of unique parcel identifiers. Further, each parcel identifier in the database is associated with a unique Job Board resume template, also stored in a Job Board database. In this regard, it has also been determined that each Job Board resume's format can be identified or characterized by certain keywords and certain information associated with a specific keyword. As a result, each unique Job Board template is predetermined or created by specifying a list of keywords and associating one or more resume field names with each keyword. The keyword identifies a specific resume heading or subheading (e.g., "Education") and one or more possible field names (e.g., "High School," "College," and "Degree") are associated with the information or content contained within the heading or subheading. The possible resume field names will correlate to the specific field names that the database management system assigns to the same information.

Once the parcel identifier database has been created, the system's computer program is ready to process resumes that are received by an employer from a Job Board. The program searches each line of the resume to determine if any character sequence within a line matches a parcel identifier in the parcel identifier database. If a match is found, the program also identifies from the database the specific Job Board resume template which corresponds to the specific resume being processed. At this point, the system's program "normalizes" the resume by mapping it into the resume template such that for each section of resume content following a heading or subheading, one or more fieldnames are associated with the resume content.

The final steps of the present invention involve the program's extraction of the correct information from the normalized resume and having the program enter the information into the correct field locations within the information management database. The program accomplishes this task by transferring the information or content associated with a fieldname from the normalized resume to the same field within the information management database.

BRIEF DESCRIPTION OF THE DRAWINGS

FIG. 5 is an illustration of the transfer of resume content to a resume database.

DETAILED DESCRIPTION OF THE INVENTION

Figure 1:
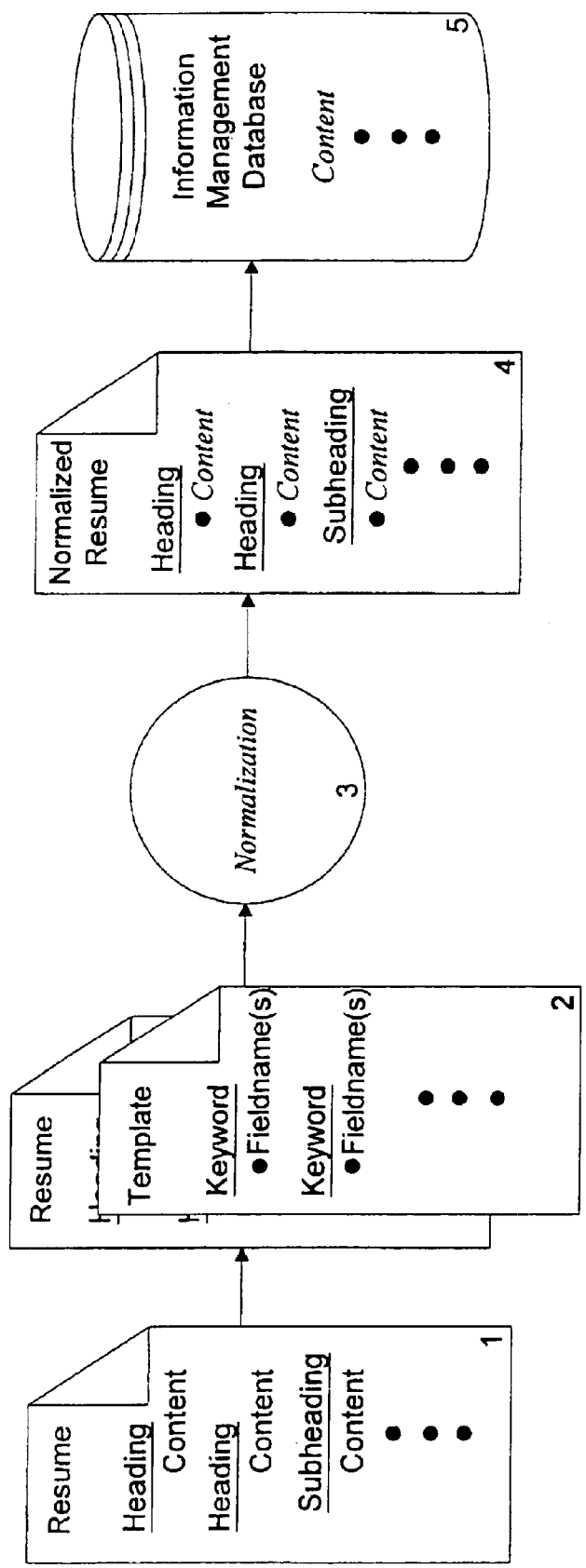
FIG. 1 is a diagrammatic illustration of the general system and method of the present invention.

FIG. 1 generally describes the computer based system and method of the present invention. Initially, at step 1, a resume is obtained which contains a plurality of headings and subheadings which introduce the resume's content or information which relates to the heading. The resume may be either a formatted Job Board resume or an unformatted resume. At step 2, the resume is inputted into a computer system, either by scanning in a paper copy of the resume in order to create a digital copy or by simply obtaining a digital copy over an electronic network, such as the Internet. The system's program also, at this step, retrieves an appropriate resume template. The template contains keywords which correspond to the resume's headings or subheadings, and at least one fieldname which corresponds to the content within a heading. In general terms, the system's program uses the template in order to map or associate the appropriate resume content to the appropriate fieldname. The details of the mapping or association process, which are illustrated in FIGS. 2, 3 and 4, are referred to in the present invention as the "normalization" of the resume, which is illustrated at step 3.

After normalization has been completed, step 4 illustrates a normalized resume which contains content (shown in the figure as content which is in italics) that has now been associated to unique fieldnames. Finally, step 5 depicts the transfer of the content from the normalized resume to an information management database where the content is stored in predetermined locations within the database.

Figure 2:
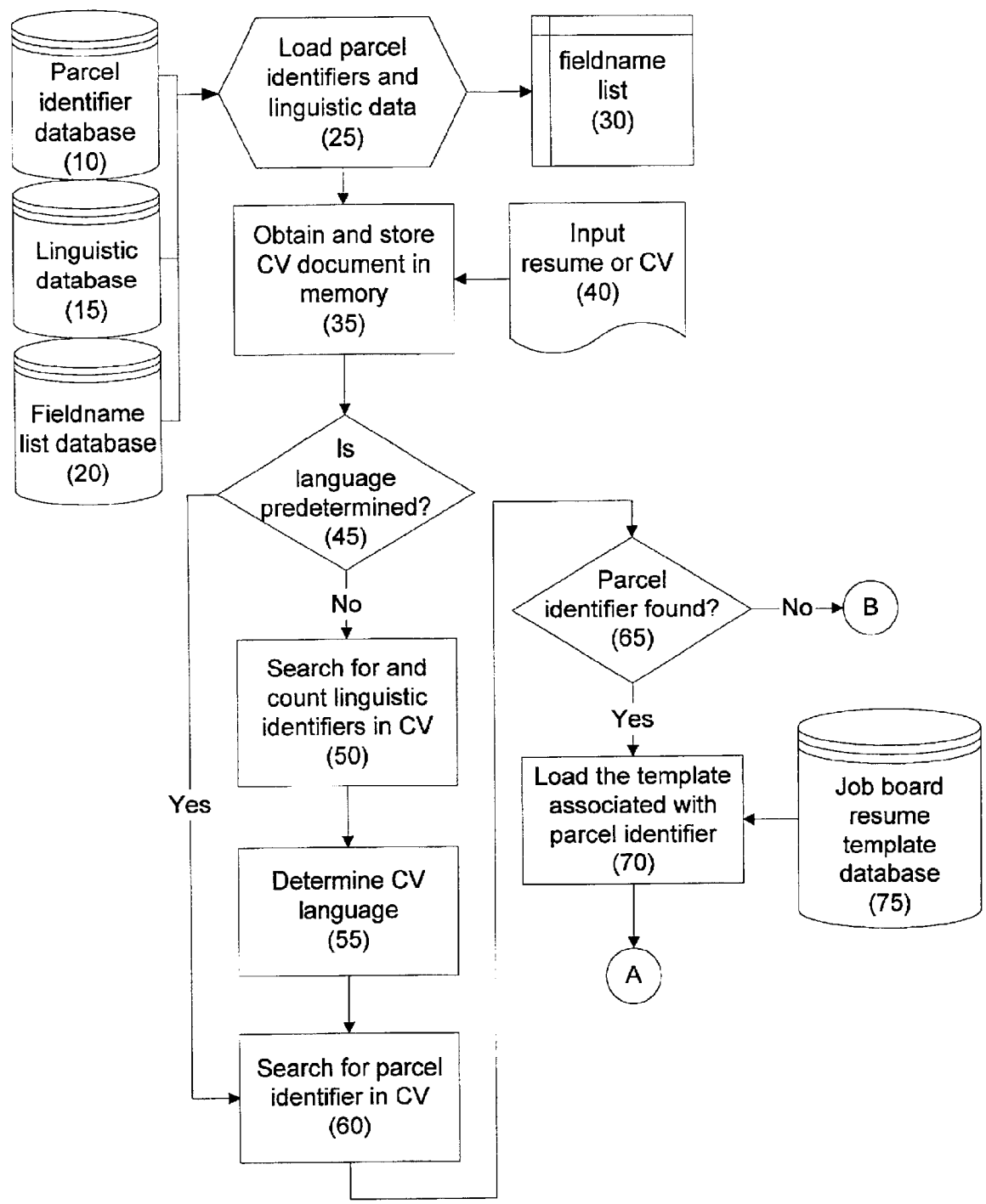
FIG. 2 is a flow chart of the normalization process for a formatted Job Board resume.
Figure 3:
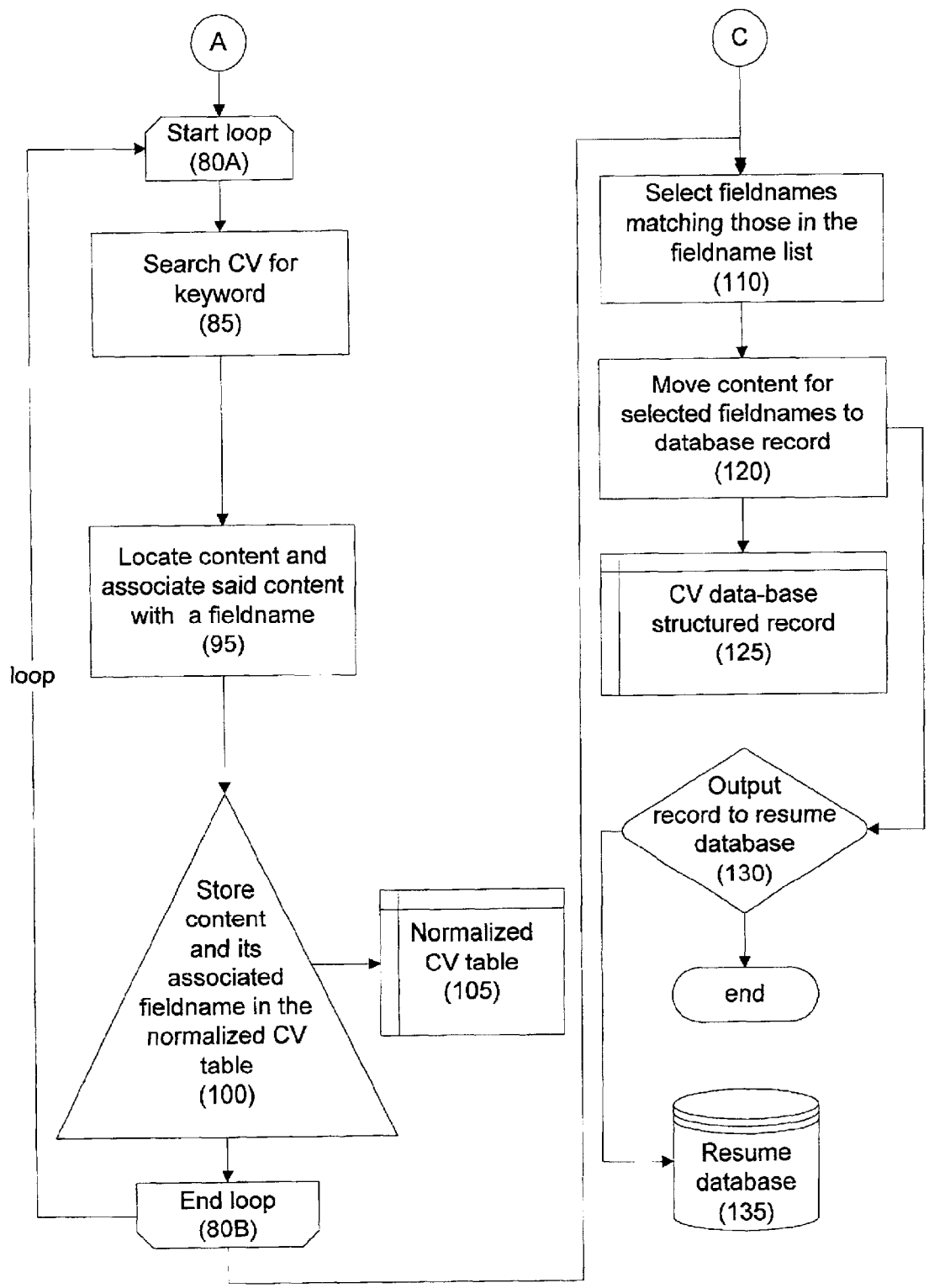
FIG. 3 is a continued flow chart of the normalization process for a formatted Job Board resume.
Figure 4:
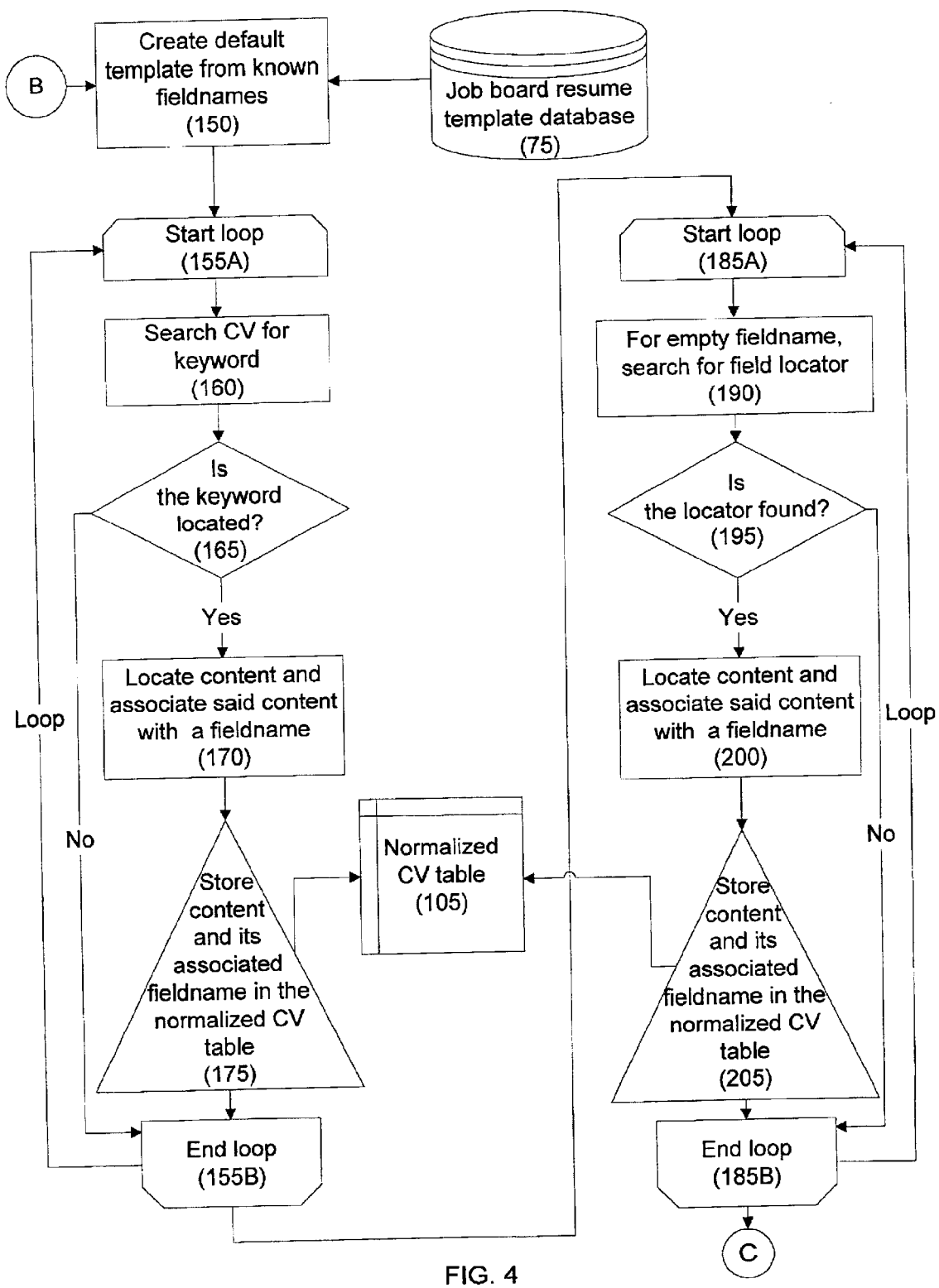
FIG. 4 is a flow chart for an unformatted resume normalization process.

Referring now to FIGS. 2, 3 and 4 which illustrate the resume normalization process in detail. As shown in FIG. 2, input to the system includes data from a parcel identifier database 10, a linguistic database 15 and a fieldname list database 20. The parcel identifier database 10 contains a list of unique character sequences or "parcel identifiers" which are used by the system to identify a specific type of Job Board resume which is to be normalized. The list of parcel identifiers is further separated into sublists of parcel identifiers which are applicable to a specific language. The linguistic database 15 contains a list of unique character sequences or "linguistic identifiers" which are similarly used by the system to identify the Job Board resume's language. Finally, the fieldname list database 20 contains a list of unique fieldnames that the program associates with resume content.

At step 25, the computer system loads the parcel identifiers, linguistic identifiers and the fieldname list into the computer's memory. At step 30, the system's program displays to the operator the list of fieldnames that were stored in memory at step 30, and the operator, who is operating the computer display device, keyboard and mouse, uses the keyboard or mouse to select each resume fieldname from the list which corresponds to the content within a resume that the operator wants to extract and transfer to an information management database. Additionally, the operator may identify the resume's language.

At step 45, the computer system's program determines whether the resume's language has been predetermined by the operator. If the language is known, program control proceeds to step 60. If the language is not determined, the system's program at step 50 searches the resume to determine whether it contains any character sequences that match one or more linguistic identifiers, and the program counts the number of matches which are located for each linguistic identifier. At step 55, the resume's language is then determined by selecting the language which corresponds to the linguistic identifier which has the largest match count, and program control proceeds to step 60. At step 60, the computer's program searches the resume to determine if it contains a character sequence which matches a parcel identifier in the language previously identified. If at step 65 a parcel identifier match is found, the system's program utilizes the parcel identifier, at step 70, to identify the resume template, from the template database 75, which is associated with the resume, and stores the resume template in memory.

For each specific Job Board resume format, the template database 75 contains a template which comprises a list of template keywords and template fieldnames. The template keywords correspond to a resume heading or subheading (e.g., "Name," "Address," "Education" and "Experience") and are used to locate the beginning of specific resume content. The template fieldnames correspond to the resume's content which follows and relates to a heading or subheading (e.g., "Susan B. Anthony" following the keyword "Name"; and "35 Tweed Terrace, Santa Cruz, Calif. 92301" following the keyword "Address"). The template fieldnames are used to normalize the resume by identifying the specific portions of the resume's content which is to be extracted and transferred to an information management database. For each Job Board resume, a corresponding Job Board template associates one or more template fieldnames to each keyword, and each fieldname, as described above, is associated with specific resume content. The template may be illustrated as follows:

<keyword$_1$>
    <fieldname $_{1(1)}$> <fieldname $_{1(2)}$> . . . <fieldname$_{1(p)}$>
<keyword$_2$>
    <fieldname$_{2(1)}$> <fieldname$_{2(2)}$> . . . <fieldname $_{2(q)}$>

.
.
.

<keyword$_n$>
    <fieldname$_{n(1)}$> <fieldname$_{n(2)}$> . . . <fieldname$_{n(r)}$>

Now, turning to FIG. 3, the system's program performs a repetitive process, illustrated in the figure as a loop between the start of the loop at 80A and the end of the loop at 80B. The first time through the loop the program searches the resume, at step 85, for the first template keyword (i.e., "keyword$_{1(1)}$"). Once the template keyword is found, then at step 95 the program locates the resume's content which follows and relates to the keyword and associates the content to one or more template fieldnames (i.e., <fieldname$_{1(1)}$> <fieldname$_{1(2)}$> . . . <fieldname$_{1(p)}$>). For example, if there is one template fieldname (i.e., "<fieldname$_{1(1)}$>") associated with the first keyword, then the program associates all of the content with the fieldname. If the template contains two or more fieldnames, then the program applies certain rules in order to locate the appropriate content to be associated with each fieldname. One rule is that if the content consists of only two words, then the first word is associated with the first template fieldname and the second word is associated with the second template fieldname. Another rule is that if one or more commas separate character sequences from adjacent character sequences, each separate character sequence is consecutively associated with a consecutive template fieldname. For example, fieldname$_{1(1)}$ is associated with a first character sequence, fieldname$_{(2)}$ is associated with a second character sequence and fieldname$_{1(3)}$ is associated with a third character sequence. Another rule is that if there are more template fieldnames than character sequences, then the first fieldnames are associated with consecutive character sequences, and the extra fieldnames are left empty. Finally, if there are more character sequences than there are template fieldnames, then the program deletes the shortest character sequence and determines if the number of fieldnames then matches the number of character sequences. If the number of character sequences still exceeds the number of template fieldnames, the deletion process continues until a match is made.

Once the first template keyword (i.e., "<keyword₁>") and its associated template fieldnames and each fieldname's content has been identified, the data is stored at step 100 in a normalized resume table 105 as follows:

| Normalized Resume Table | |
|---|---|
| Fieldname $_{1(1)}$ | Content $_{1(1)}$ |
| Fieldname $_{1(2)}$ | Content $_{1(2)}$ |
| Fieldname $_{1(3)}$ | Content $_{1(3)}$ |
| . | . |
| . | . |
| Fieldname $_{1(p)}$ | Content $_{1(p)}$ |

Program control then passes to the end of the loop at step 80B where the program determines if any additional template keywords need to be searched. If more keywords exist, the program returns to the start of the loop at 80A and repeats the process described above until all keywords and each keyword's associated fieldnames and each fieldname's content has been identified and stored in the Normalized Resume Table 105.

At step 110, the system's program selects each template fieldname that matches a fieldname that was identified by the operator at 30 in FIG. 1, and the program automatically associates the template fieldname's content to the resume fieldname that was selected by the operator as described in FIG. 1. Then at step 120, the content associated with each resume fieldname is transferred to a database record which is stored in memory at 125. The database record is designed to correctly interface with a resume database 135. Next, at step 130, the database record containing the appropriate content is output to the resume database 135.

Returning to FIG. 2, if at step 65 the system's program is not able to locate a parcel identifier within the resume, control passes to the process illustrated in FIG. 4. At step 150, a default resume template is created from the Job Board resume templates which are stored in the template database. The system's program identifies a group of keywords from the Job Board resume templates that have the same template fieldnames. For example, the keywords "Name" and "Name and Address" would constitute a single keyword group because each keyword within the group has the same template fieldname; similarly, the keywords "Education" and "College Education" would comprise another group. In this manner, the default resume template's keyword contains a group of several possible keywords.

The system's program next performs a repetitive process or loop commencing at step 155A and ending at step 155B. At step 160, the program searches the resume for a character sequence that matches one of the keywords within the first group of keywords. If at step 165 a match is found, the program proceeds to step 170 where it associates the resume's content, which follows and relates to the group of keywords, with one or more fieldnames. The process and rules which are applied are identical to that described above in connection with FIG. 3, except that at step 165 the program determines if a keyword is located. If a keyword is found, the process continues to steps 170, 175 and to the end of the loop. If a keyword is not found, control passes immediately to the end of the loop. Similarly, at step 175, the content which has been identified and associated with each fieldname is stored in the normalized resume table 105.

Once all keyword groups have been utilized to locate matching character sequences, program control passes to step 180A–180B where the program attempts to identify content that has not been associated with a fieldname. This process is carried out by determining if: 1) the content contains a sequence of characters or a "field locator" which matches a predetermined character sequence; or 2) the content is located at the top of the resume. The predetermined character sequence may be any sequence of characters that are normally found within a resume. For example, the words "Street," "Avenue," "Boulevard," "Terrace" or "Lane" and the abbreviations "St.," "Ave.," "Bl.," "Terr.," and "Ln." are normally set forth in the address portion of a resume. Similarly, five (5) sequential numbers normally would be a zip code. Accordingly, at step 190, the program searches for a field locator. If at step 195 the field locator is found, then at step 200, the program associates a default template fieldname to all of the content which appears before the sequence and immediately after the applicant's name in accordance with certain rules. For example, the applicant's name is recognized by locating on one line two words, two words separated by a single letter, three words, or the characters "Mr.," "Mrs.," "Ms.," or the like. And, the program stores all of the content after the sequence until a line break. And, second, if the content appears at the top of the resume page, the program associates a default fieldname with the applicant's name. If at 195 no field locator is found, control passes to the end of the loop. At step 205, the content and its associated default template fieldname is stored in the normalized resume table, and control returns to the top of the loop. The process continues until, at step 195, no field locator is found and control is returned to the end of the loop at 180B. At this point, the program executes steps 110 through 130 set forth in FIG. 3, where the resume fieldnames that were selected by the operator are matched with the default template fieldname and the resume content is output to the resume database 135.

FIG. 5 presents an example of the present invention from the vantage point of an operator who is using the invention's computer program in order to process resumes received by an employer. Once the resume has been stored in the memory of the employer's computer system, the operator initiates the normalization process by inputting a predetermined command which instructs the computer to execute the normalization process. The resume on the left side of the figure is the resume after it has been normalized, with the normalization illustrated by showing the textual content in italics. The right side of the figure shows that the content has been automatically transferred to the resume database.

While the present invention has been described with reference to a few embodiments, the description is illustrative of the invention and is not to be construed as limiting the invention. Various modifications may occur to those skilled in the art without departing from the scope of the invention as defined by the appended claims.

What is claimed is:

1. A computer implemented method of transferring alien free-text, unstructured multi-lingual information from a resume to a discreet information categorization, comprising:
   a) pre processing a resume using lexical and content analysis to:
      i) determine the language of the resume;
      ii) determine the origin of the resume;
      iii) determine to layout and general topology of the resume; and
      iv) determine the discreet type of the resume based on the determined language, layout and topology of the resume;
   b) selecting a processing template based on steps a.i. to a.iv. and inputting the template into memory, said template having a discreet (predetermined) number of layouts, topologies and categories and sets or series of sections of text information for each category;

c) providing a set of default templates per determined language when the lexical and content analysis fails to determine the layout, topology and type of the resume;

d) implementing the default templates to allow the system to extract the most important information on the resume allowing an automated contact generation and response to a resume originator, e) automatically generating a contact or response to the resume originator by either electronic or paper based means;

f) normalizing the resume by using the template to associate each resume content section with a discreet information category thereby creating a plurality of normalized resume contents; and g) automatically transferring each normalized resume content to a resume data section within a discreet data store comprising a database or a tagged data store including XML in which each said resume data section is identified by a storage section identifier comprising a fieldname or a tag-name mapped to the normalized resume content.

2. The method of claim 1 in which at least one keyword matches a sequence of characters within a resume heading or a resume content.

3. The method of claim 1 in which one syntactical language categorization matches a sequence of characters section within a resume heading.

4. The method of claim 1 in which one syntactical language categorization matches a sequence of characters section within a resume content.

5. The method of claim 1 in which the resume is in a language other than English.

6. The method of claim 1, wherein in step d) if a resume type determined that a default template is used, then the default template is based on the determined language.

7. The method according to claim 6, wherein implementing the default template comprises searching for alternative lexical and language structures, layouts, topologies and keywords of a group to associate a resume content with the category associated with the group.

8. The method according to claim 6, wherein step f) further comprises:
   identifying any unmatched resume content not associated with any group of alternative layouts, topologies and keywords;
   searching the unmatched resume content for a field locator; and
   associating the unmatched resume content with a fieldname corresponding to the field locator if the field locator is found in the unmatched resume content.

9. The method according to claim 8, wherein the field locator comprises a sequence of characters that is indicative of resume content in resumes.

10. The method according to claim 1, wherein step a.iv. of determining a resume type comprises locating a parcel identifier in the resume, wherein the parcel identifier is a unique character string that is indicative of a particular job board.

11. A system for transferring free text, unstructured, multi-lingual information from a resume to a discreet data store comprising:

means for inputting a resume into a memory, said resume being of unknown language and having a plurality of resume contents;

means for pre processing the resume using lexical and content analysis to determine the language of the resume;

means for pre processing the resume to determine a resume type based on the language and the lexical and content analysis of the resume;

means for selecting a processing template based on the resume type, and inputting the template into memory, the template having a discreet number of layouts, topologies and categories and sets or series of sections of text information for each category;

means for normalizing the resume by using the template to associate each resume content section with a discreet information category thereby creating a plurality of normalized resume contents;

means for automatically transferring each normalized resume content to a data section within a discreet data store comprising a database or a tagged data store including XML in which each said resume data section is identified by a storage section identifier comprising a fieldname or a tag-name mapped to the normalized resume content; and means for an automated resume response mechanism to a resume originator using either electronic or paper based.

12. A computer readable medium having program code recorded thereon that, when executed, causes a computing system to transfer free text, multi-lingual information from a resume to a data store, the program code comprising:

code for inputting a resume, of unknown origin, content and format, into memory, said resume having a plurality of language, layout and contents;

code for preprocessing the resume, using lexical and content analysis, to determine the origin and language of the resume;

code for preprocessing the resume to determine a resume type based on the determined language, origin, layout and topology of the resume;

code for selecting a template based on the determined type of resume and inputting the template into memory, said template having a discreet number of layouts, topologies and categories and sets or series of sections of text information for each category;

code for selecting a default template when the resume type cannot be determined to allow the system to extract the most important information on the resume allowing an automated contact generation and response to the resume originator;

code for automatically transferring each normalized resume content to a data section within a discreet data store comprising a database or a tagged data store including XML in which each said resume data section is identified by a storage section identifier comprising a fieldname or a tag-name mapped to the normalized resume content; and code for automatically generating a contact or response to a resume originator using either electronic or paper based means.

* * * * *